United States Patent [19]
Dimitri et al.

[11] Patent Number: 5,999,356
[45] Date of Patent: Dec. 7, 1999

[54] DATA CARTRIDGE LIBRARY WITH ROTATING STORAGE STACKS

[75] Inventors: Kamal Emile Dimitri; John Edward Kulakowski; Rodney Jerome Means, all of Tucson, Ariz.

[73] Assignee: International Business Machines Corporation, Armonk, N.Y.

[21] Appl. No.: 08/919,799

[22] Filed: Aug. 29, 1997

[51] Int. Cl.⁶ .................................................. G11B 15/18
[52] U.S. Cl. ............................. 360/71; 360/92; 369/36; 369/178; 414/932
[58] Field of Search ..................... 360/69, 71, 92; 369/36, 38, 178; 414/932

[56] References Cited

U.S. PATENT DOCUMENTS

| | | | |
|---|---|---|---|
| 5,019,927 | 5/1991 | Simone | 360/92 |
| 5,285,333 | 2/1994 | Barr et al. | 360/92 |
| 5,303,214 | 4/1994 | Kulakowski et al. | 369/34 |
| 5,336,030 | 8/1994 | Ostwald et al. | 414/277 |
| 5,429,470 | 7/1995 | Nicol et al. | 360/92 X |
| 5,498,116 | 3/1996 | Woodruff et al. | 414/331 |
| 5,537,371 | 7/1996 | Niederlein et al. | 369/36 |
| 5,539,712 | 7/1996 | Menke et al. | 369/36 |
| 5,546,315 | 8/1996 | Kleinschnitz | 364/478.06 |
| 5,612,934 | 3/1997 | Dang et al. | 369/36 |

*Primary Examiner*—Andrew L. Sniezek
*Attorney, Agent, or Firm*—John H. Holcombe; Robert M. Sullivan

[57] ABSTRACT

An automated library is disclosed for storing and retrieving data storage cartridges having a plurality of rotatable stacks, all rotatable about parallel axes, each stack being multi-faced and preferably rectangular. A column of cells for storing data cartridges is provided in each of at least two of the faces of the rectangular stacks, and the columns of cells are aligned parallel to the axis of the associated stack. At least one read/write drive is provided for reading and/or writing the data storage cartridges, and preferably a read/write drive is provided at the base of each rotatable stack. A picker is rotatable about an axis parallel to the axes of the rotatable stacks, for accessing the data storage cartridges stored in the cells, and for transporting the cartridges between the cells and a read/write drive. Servo systems rotate the rotatable stacks and the rotatable picker into mutually facing positions for accessing the cells of columns of the stacks with the rotatable picker.

18 Claims, 10 Drawing Sheets

| DRIVE STATUS | | |
|---|---|---|
| DRIVE | B | U |
| 1 | | |
| 2 | | |
| 3 | | |
| 4 | | |
| 5 | | |
| 6 | | |

170

B = BUSY
U = UNLOADED

| LIBRARY ELEMENTS | | |
|---|---|---|
| STACK | B | L |
| 1 U | | |
| 1 L | | |
| 2 U | | |
| 2 L | | |
| 3 U | | |
| 3 L | | |

171
172

B = BUSY
L = A, B, C OR D

| QUEUE ENTRY | | | | | | |
|---|---|---|---|---|---|---|
| T | C | W | P | FROM | TO(1) | TO(2) |
| | | | | | | |

C = COMPLETED FLAG
W = WORKING FLAG
P = STACK POSITIONED FLAG
T = MOVE OR EXCHANGE FLAG

DATA CARTRIDGE LIBRARY WITH ROTATING STORAGE STACKS

TECHNICAL FIELD

This invention relates to libraries for storing data cartridges in cells, and, more particularly, for expanding the capacities of data cartridge libraries while retaining the access speeds.

BACKGROUND OF THE INVENTION

Automated data storage libraries typically store cartridges of tape or of optical disks and are secondary to disk storage for the storage of data for data processing systems. Disk storage is relatively high in cost and therefore limited in capacity. The function of data storage libraries is to store data which is not constantly required, but is on line and available quickly when needed. Data storage libraries therefore must be efficient in maximizing capacity in limited space while accessing the stored data quickly.

Typical automated data storage libraries have stationary columns of cells for storing data cartridges. Pickers either move linearly or rotate to access the columns. Some libraries have been contemplated which rotate a cylinder of columns of cells while maintaining the picker stationary. The configurations typically have a single row of columns of cells, or, in a few instances, a row on either side of the picker. Capacity may be increased by increasing the length of the rows of cells. However, the length of the rows is limited by the designed maximum length of time allowed for accessing the data cartridges.

Thus, it is desirable to maximize storage capacity and yet be as compact as possible to avoid excessive data access times.

SUMMARY OF THE INVENTION

It is an object of the present invention to expand the capacities of data cartridge libraries while retaining the access speeds.

An automated library is disclosed for storing and retrieving data storage cartridges having a plurality of rotatable stacks, all rotatable about parallel axes, each stack being multi-faced and preferably rectangular. A column of cells for storing data cartridges is provided in each of at least two of the faces of the rectangular stacks, and the columns of cells are aligned parallel to the axis of the associated stack. At least one read/write drive is provided for reading and/or writing the data storage cartridges, and preferably a read/write drive is provided at the base of each rotatable stack. A picker is rotatable about an axis parallel to the axes of the rotatable stacks, for accessing the data storage cartridges stored in the cells, and for transporting the cartridges between the cells and a read/write drive. Servo systems rotate the rotatable stacks and the rotatable picker into mutually facing positions for accessing the cells of columns of the stacks with the rotatable picker.

The columns of cells may be offset to one side of the faces of the rotatable stacks and located in the corners of the rectangular stacks.

Each rotatable stack may be a plurality of independently rotatable stacks on a single axis.

Additionally, ones of the columns of cells may comprise removable bulk load containers.

For a fuller understanding of the present invention, reference should be made to the following detailed description taken in conjunction with the accompanying drawings.

DETAILED DESCRIPTION OF THE INVENTION

Figure 1:
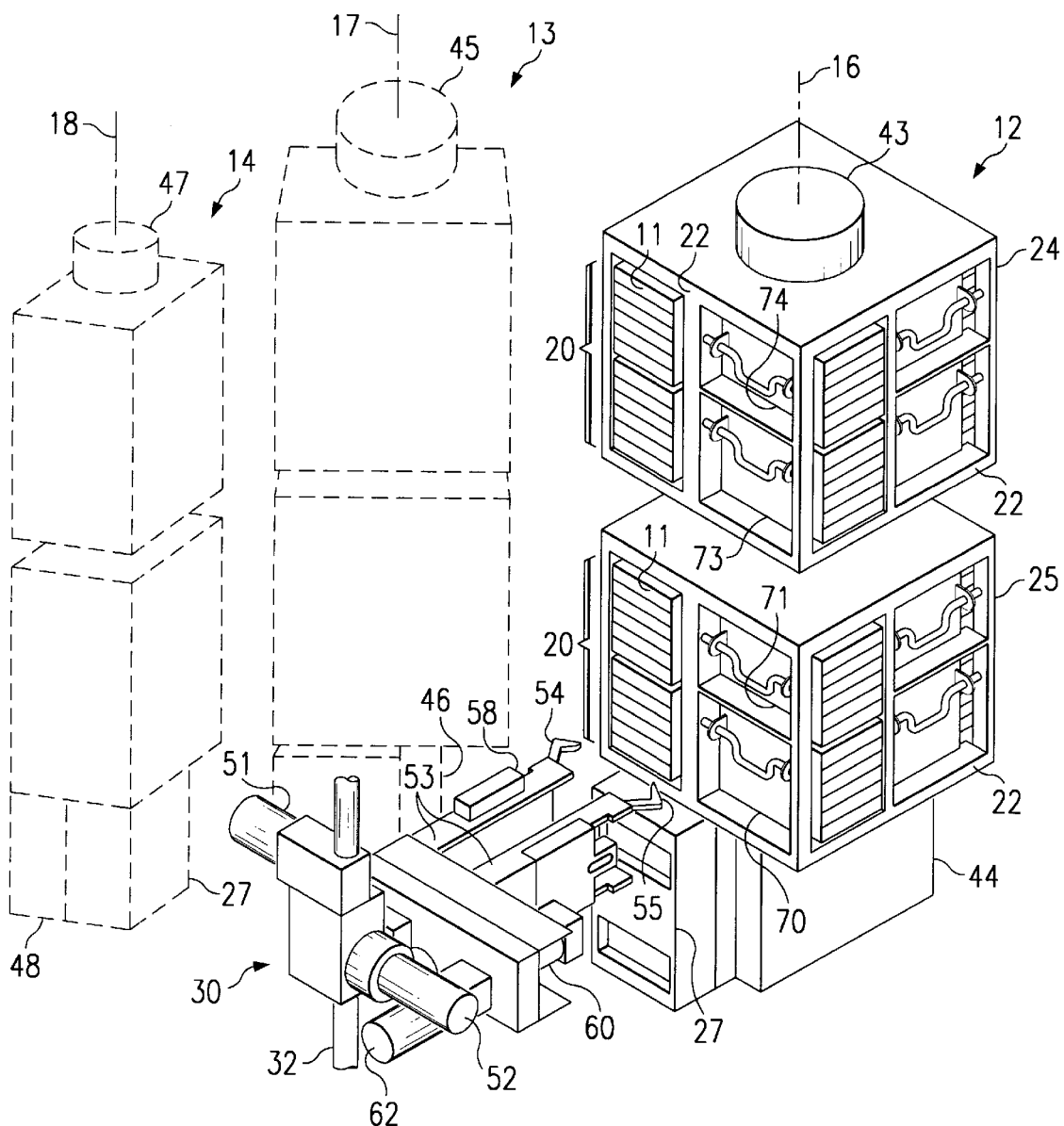
FIG. 1 is a perspective representation of one embodiment of an automated library system of the present invention.
Figure 2:
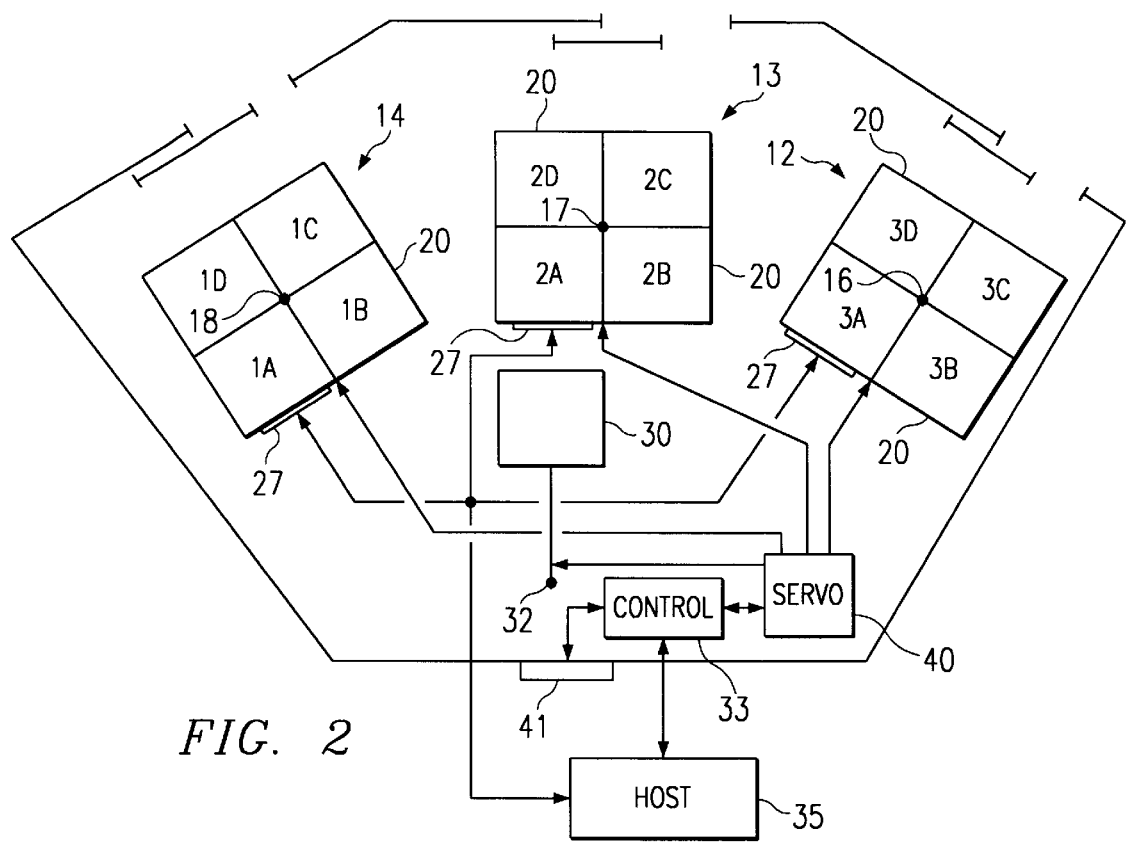
FIG. 2 is a block diagram of the automated library system of FIG. 1.

Referring to FIGS. 1 and 2, one embodiment of an automated library is illustrated for storing and retrieving data storage cartridges 11. The library includes a plurality of rotatable stacks 12, 13 and 14, all rotatable about parallel axes 16, 17 and 18. Each of the stacks is preferably rectangular. A column of cells 20 for storing data cartridges 11 is provided in each corner of the rectangular stacks, and the columns of cells are aligned parallel to the axis of the associated stack. The columns of cells 20 preferably are located in each of the four faces 22 of the stacks, and offset to one side of the faces of the stacks. Each of the rotatable stacks may include two independently rotatable stacks 24 and 25 on a single axis. At least one, and preferably two, read/write drives 27 are provided for reading and/or writing the data storage cartridges, located preferably at each rotatable stack for high access speeds.

A picker 30 is rotatable about an axis 32 which is parallel to the axes 16, 17 and 18 of the rotatable stacks. The picker 30 accesses the data storage cartridges 11 stored in the columns of cells 20, and transports the cartridges 11 between the cells and a read/write drive 27. Data read from or written to the data cartridges 11 by the read/write drives 27 is transmitted to or received from library system controller 33 over conventional data communication lines (not shown) and is communicated to host data processing system 35.

The host data processing system 35 may comprise a plurality of processors or a server for a system of processors, and sends requests to the automated library system controller 33 to retrieve selected cartridges 11, and to store the cartridges in selected locations. Library system controller 33 includes at least one computing processor, and is interconnected with, and controls the actions of, the read/write drives 27 (through their associated controllers), the rotatable stacks 12, 13 and 14, and the accessor 30, all through their associated servo systems, illustrated as a single block 40. The library manager is also provided with a keyboard 41 and is interconnected through a provided interface to the host processors 35. Data access commands and information to be recorded on, or to be read from, selected cartridges 11 may be transmitted directly between the drives 27 and the host 35. Library system controller 33 conducts move commands and issues the access commands. The host is provided with a database for tables and programs and allocates resources and issues the move commands to the library system controller 33. The host 35 controls the operation of the read/write units 27, providing commands, e.g., for load unload search, read write, etc.

In an alternative embodiment, the library system controller may store the database and respond to host I/O commands to issue the move commands, control the operation of the read/write units, and read and write data to the drives.

Servo systems operated by servo controller 40 rotate the rotatable stacks 12, 13 and 14, and the rotatable picker 30 into mutually facing positions for accessing the columns of cells 20 with the rotatable picker 30. The servo controller 40 operates servo motors 43, 45 and 47 to rotate the top stacks of rotatable stacks 12, 13 and 14 and operates servo motors 44, 46 and 48 to rotate the bottom stacks of rotatable stacks 12, 13 and 14.

The servo controller 40 positions the picker 30 to the desired stack by operating servo motor 51 to rotate the picker about shaft 32 to be positioned at the facing column of cells 20 of the desired stack. The servo controller 40 operates servo motor 52 to move the picker 30 up and down the shaft 32 so that picker arms 53 and gripper elements 54 and 55 are positioned adjacent the desired one of the cartridges 11. An optical sensor 58 is employed to read the bar code label on the cartridges to insure that the desired cartridge is being accessed.

The picker mechanism 30 gains access to the cartridges 11 by motor 60 moving the grippers 54 and 55 forward to engage the cartridge. If the cartridges are two sided, such as optical disk cartridges, motor 62 may "flip" or pivot picker arms 53 about a central pivot point so that grippers 54 and 55 are inverted to invert the cartridge and provide the cartridge in either an up or an inverted position to read/write drive 27.

As illustrated in FIG. 2, the corners of the rotatable stacks 12, 13 and 14, each containing a column of cells, are designated as A, B, C and D, respectively. The columns of cells in stack 14 are therefore designated as 1A, 1B, 1C and 1D, the columns of cells in stack 13 are designated as 2A, 2B, 2C and 2D, etc. The separate upper and lower independently rotated stacks are designated as Upper and Lower, respectively. Each of the columns of cells are offset to the left and occupy the left corner of the stack. The stacks are positionable in any of four positions so that the desired column of cells is positioned in a direction to face the picker 30.

Figure 3A:
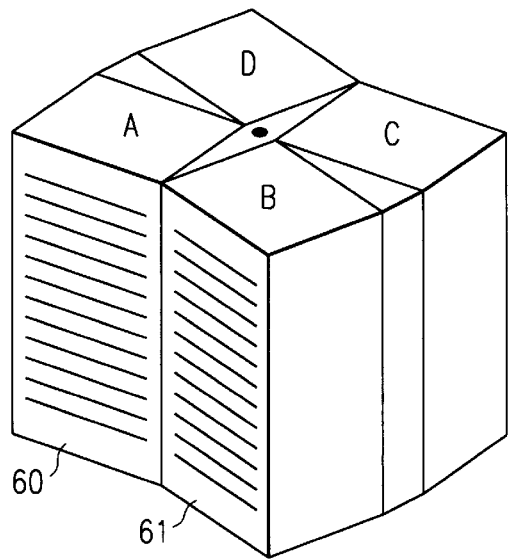
FIGS. 3A and B are diagrammatic representations of an alternative automated library system of the present invention.
Figure 3B:
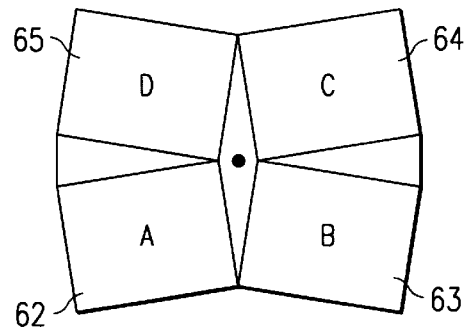

FIGS. 3A and 3B illustrate an alternative embodiment of the present invention, having two columns of cells 60 and 61 on the same side of the stack. In order to allow the picker to directly face the column of cells 60 or 61, the faces 62 and 63 of the two columns of cells are angled slightly. Thus, the columns of cells are offset from the centerline of the stack to both the left and to the right. The stacks are positionable at either of two positions so that faces 62 and 63 or faces 64 and 65 are both positioned in a direction to face the picker. The stack is rotated 180 degrees from one set of faces to access the other set.

In FIG. 1, each of the illustrated columns of cells 20 is made up from bulk carriers 70 and 71, shown in the bottom stack of rotatable stack 16, and bulk carriers 73 and 74, shown in the top stack of rotatable stack 16. The bulk carriers are inserted in the right side of one face at the corner of the stack so that the cartridges will be exposed on the left side of the adjacent face.

Figure 4A:
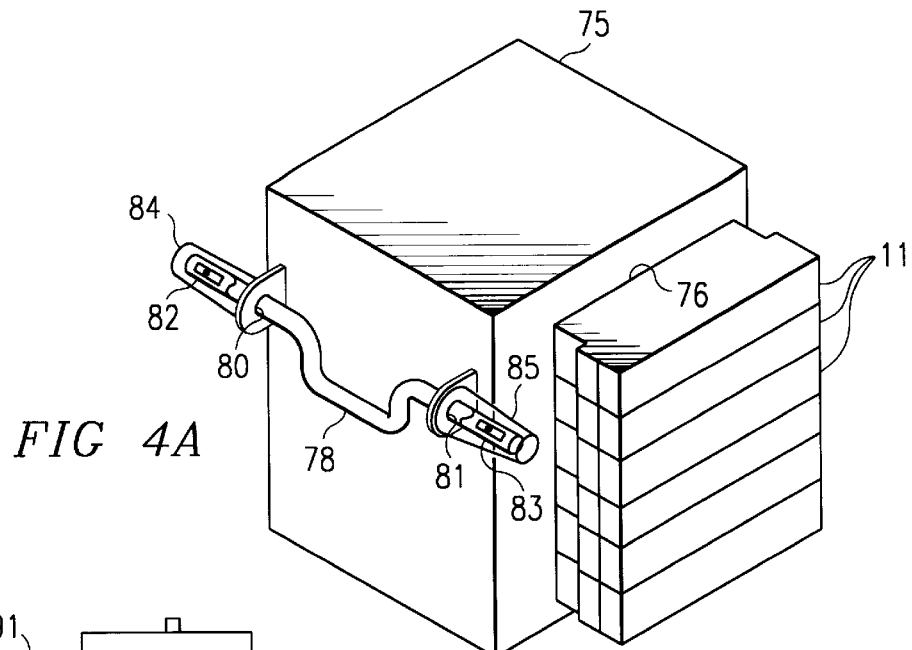
FIGS. 4A, B and C are illustrations of bulk carriers for cells and cartridges of the automated library of FIGS. 1, 2 and 3.
Figure 4B:
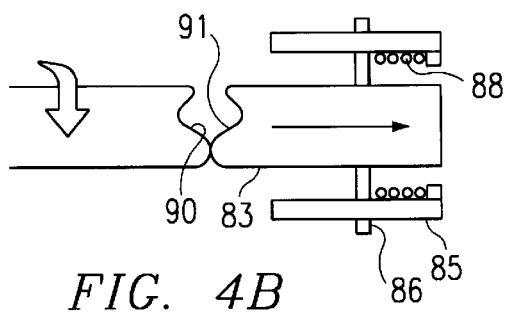
Figure 4C:
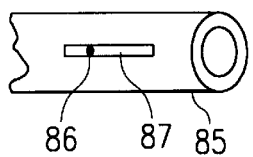

One embodiment of a bulk carrier 75 is illustrated in FIGS. 4A, 4B and 4C. Cartridges 11 are stored in cells 76 for loading in bulk into the stacks to make up the columns of cells. Handle 78 is mounted through holes 80 and 81 of carrier 75. The ends of the handle 78 are locking pins 82 and 83 which lock the bulk carrier into the stack. The locking pins are illustrated in FIG. 4A as held in position by covers 84 and 85. One of the locking pins 83 and the associated cover 85 are shown in greater detail in FIGS. 4B and 4C. Pin 86 is held against rotation in slot 87 and spring 88 pushes the pin in the direction towards the center of the handle. Rotation of the handle from a horizontal position to the downward and locked position operates cam surface 90 of the handle against cam surface 91 of the locking pin 83 to push the locking pin 83 outward against the force of the spring 88. When in position in the desired stack, the locking pin engages a corresponding hole in the stack and the opposite locking pin 82 engages an opposite hole in the stack to lock the bulk carrier 75 in position in the stack.

Figure 5:
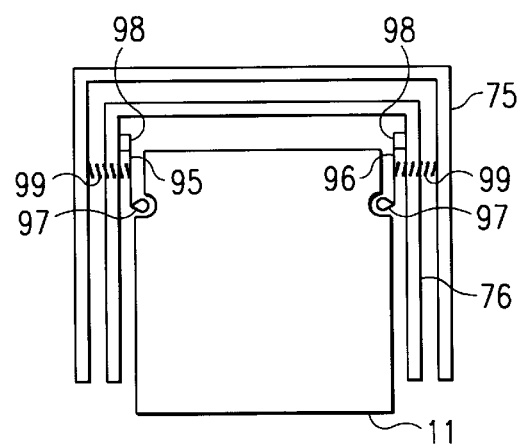
FIG. 5 is a diagrammatic representation of a cartridge and locking mechanism for the carrier of FIG. 4.

FIG. 5 illustrates the locks 95 and 96 for holding cartridges 11 in position in the bulk carrier 75. Each lock includes a sliding pin 97 which is pivoted slightly about pivot 98 by spring 99 into engagement with corresponding slots 100 in the cartridge 11.

Figure 6A:
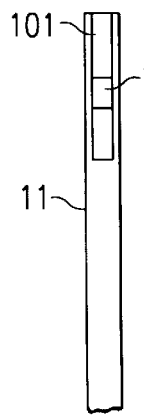
FIGS. 6A and B are side and plan, partially cut away illustrations of the cartridge employed in the automated library of the present invention.
Figure 6B:
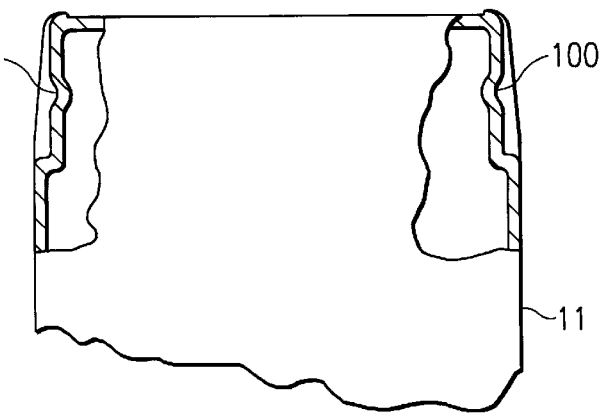

FIGS. 6A and 6B illustrate an embodiment of the cartridge 11 in greater detail. Slots 100 for the locks are located on either side of the cartridge 11 in cavities 101. The cartridge 11 may contain an optical disk, or may contain a reel of magnetic tape for the storage of data. The examplary cartridge illustrated in FIGS. 6A and 6B is an ISO 15486 optical media standard cartridge.

Figure 7:
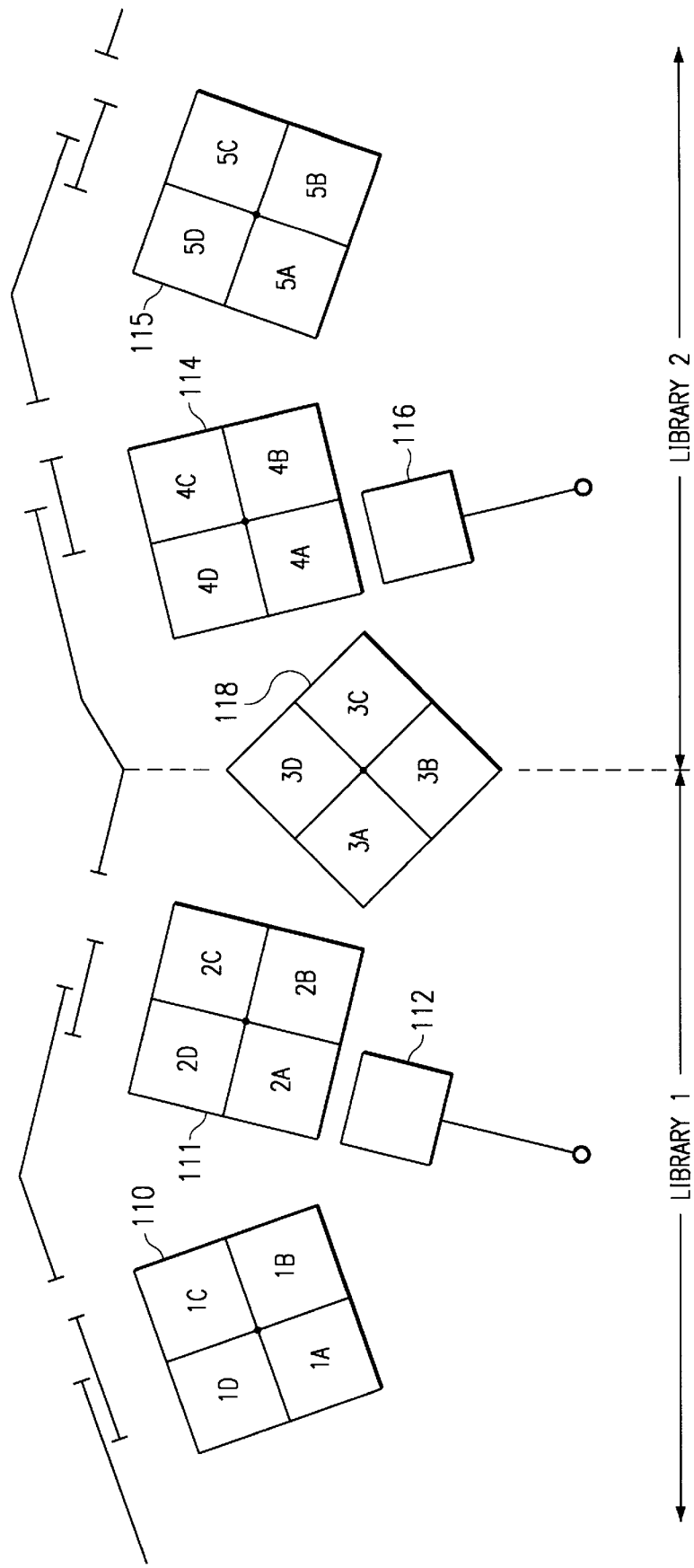
FIG. 7 is a diagrammatic representation of a combined two library system of FIGS. 1 and 2.

FIG. 7 illustrates an embodiment of a two library system which is capable of sharing data cartridges between the two libraries. One library includes two rotatable stacks 110 and 111 and a picker 112. The second library includes two rotatable stacks 114 and 115 and a picker 116. A shared stack 118 is provided so that a picker in one library may load cartridges in the shared stack to be transferred into or used by the other library.

Each of the columns 3A–3D of shared stack 118 may be shared, or, alternatively, one column may be reserved for picker 112 and the other reserved for picker 116, or any other combination may be employed.

Figure 8:
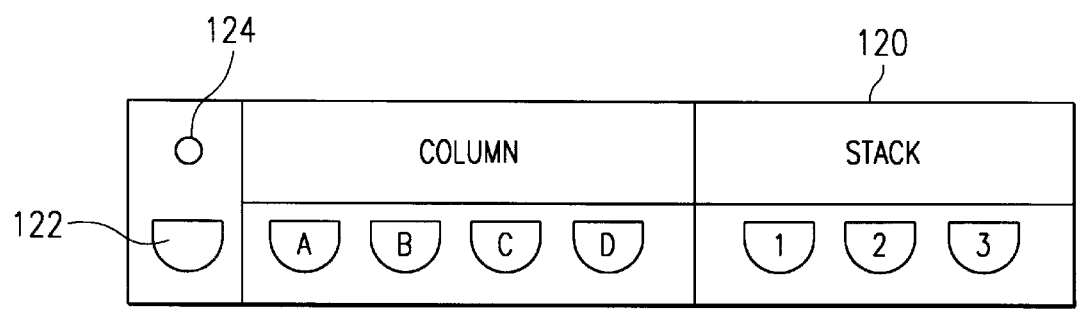
FIG. 8 is an illustration of an key pad for bulk input/output.
Figure 9:
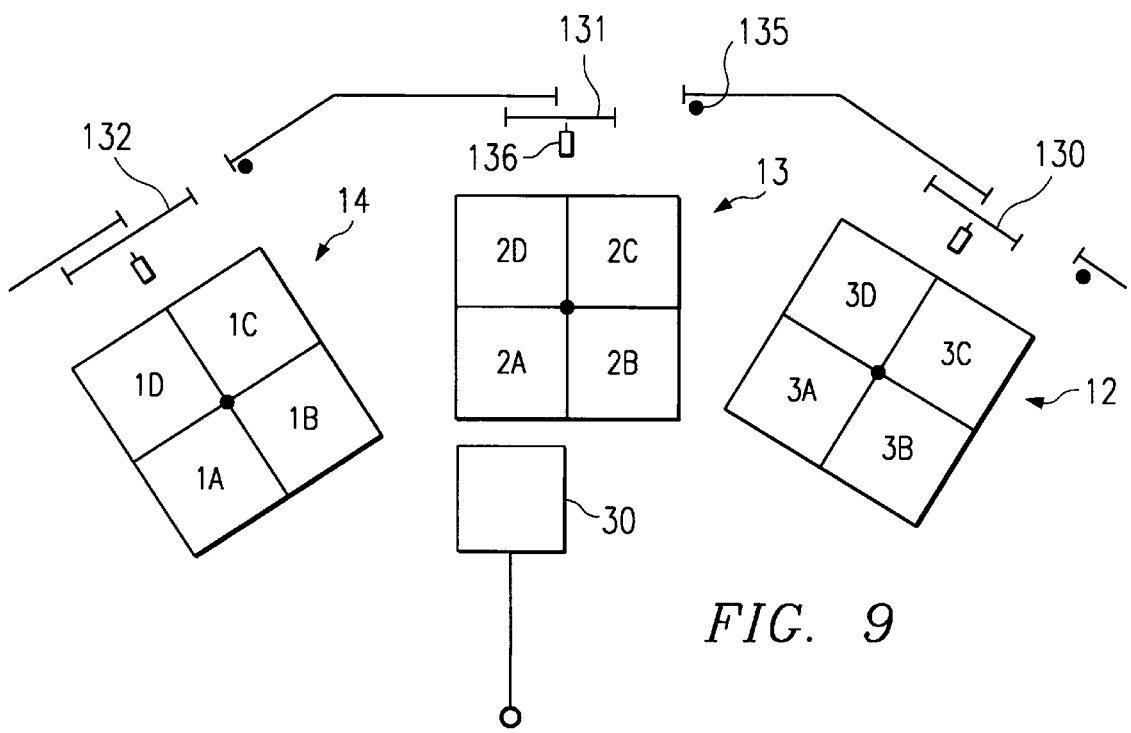
FIG. 9 is a diagrammatic representation of the automated library system of FIG. 2, illustrating the location of sliding doors for bulk input/output and sensors.

A key pad, solenoid and sensors needed for bulk entry of bulk carrier 75 of FIG. 4A into the library is shown in FIGS. 8 and 9.

FIG. 8 illustrates a bulk entry keypad 120 where an operator having a bulk carrier may designate the particular location where the bulk carrier is to be loaded or exchanged. The bulk entry keypad may be located at keyboard 41 in FIG. 1, or may be located on the reverse side of the library system. The operator selects the stack and the column by pushing the appropriate buttons and then operates bulk entry request key 122. When the selected stack and column are adjacent an entry door, an entry enabled light 124, such as an LED, is turned on by the library controller.

FIG. 9 illustrates the automated library system of FIGS. 1 and 2 with doors 130, 131 and 132 for allowing bulk entry to stacks 12, 13 and 14, respectively. For safety purposes, each door is provided with a door closed sensor 135 and a door lock solenoid 136. The door closed sensor may be a conventional optical sensor, a conventional magnetic sensor, etc. When the operator selects the bulk entry request, and the selected stack and column are positioned adjacent an entry door, the library controller both releases the door lock solenoid 136 and turns on entry enabled light 124 in FIG. 8. Conversely, upon the closing of the door by the operator, door closed sensor 135 provides a signal to the library controller which operates the door lock solenoid 136.

Figure 10:
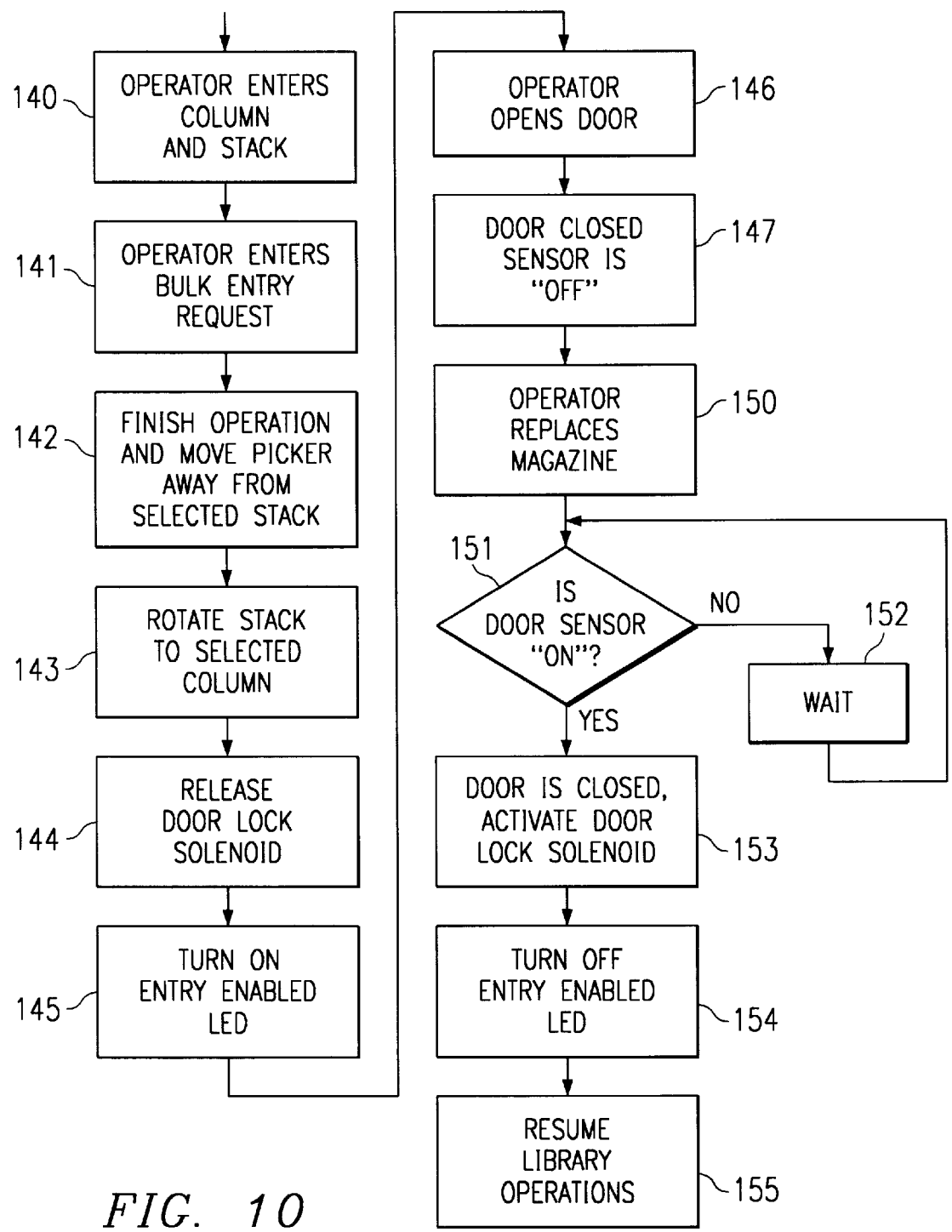
FIG. 10 is a flow diagram of the bulk input/output sequence.

One embodiment of the bulk load process is illustrated in FIG. 10. In step 140, the operator enters the desired column and stack at bulk entry keypad 120 of FIG. 8, and then enters the bulk entry request at key 122, shown as step 141 in FIG. 10. The request and desired column and stack are provided to the library controller in step 141. In step 142, the library controller notes whether any operation is being conducted at the selected stack and completes the current operation and moves the picker away from the selected stack. In step 143, the library controller rotates the selected stack, if needed, to bring the selected column of cells to the adjacent door. The door lock solenoid 136 is released in step 144, and the entry enabled light 124 is turned on in step 145.

The operator may then open the door in step 146. opening the door causes the door closed sensor 135 to change to the "off" state in step 147. The operator may then replace the bulk carrier in step 150. In steps 151 and 152, the library controller repeatably queries the door closed sensor 135 at selected clock cycles and waits to repeat the query each time the query indicates that the door closed sensor is still "off". Upon the operator closing the door, the door sensor 135 is turned "on", which is sensed in step 151. In step 153, the library controller responds to the door closed detection in step 151 by activating the door lock solenoid 136, and in step 154 the entry enabled light 124 is turned off. In step 155, the library controller resumes library operations.

Concurrent picking, etc., is allowed at other stacks during bulk carrier load/unload of one stack.

Figures 11, 12:
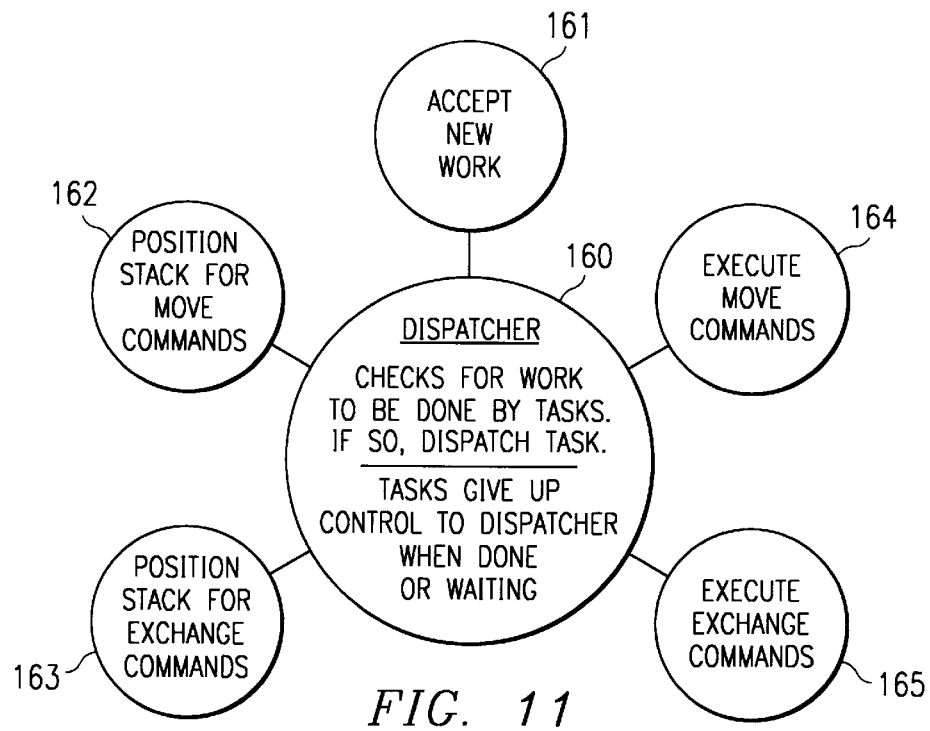
FIG. 11 is a diagrammatic representation of the operation of the automated library system of the present invention.
FIG. 12 is a diagrammatic representation of the status tables relating to the operation of the automated library system illustrated in FIG. 11.

The library controller includes a dispatcher 160 which is illustrated in FIG. 11. The dispatcher responds to input work received as commands from the host processing system or the input keyboard and dispatches the commanded tasks. When any task is completed, or is in a wait state, the task gives control back to the dispatcher. The dispatcher is preferably a program in the library controller. The types of tasks include "Accept New Work" 161, "Position Stack for Move Commands" 162, "Position Stack for Exchange Commands" 163, "Execute Move Commands" 164 and "Execute Exchange Commands" 165.

The library controller includes a data base having queues and status tables, including those illustrated in FIG. 12. Table 170 is a drive status table which indicates the busy or unloaded status of each of the read/write drives 27 in FIG. 1. The library elements status table 171 indicates whether a stack upper and lower section is busy or is available with the identification of the column of cells facing the picker. The work queue 172 indicates the status of each work entry. The work entries may take either the form of 1) Move a cartridge from a cell to a read/write drive and Move a cartridge from a read/write drive to a cell, or 2) Exchange a cartridge in a cell with one in a read/write drive and Exchange a cartridge in a read/write drive with one in a cell. The Move task requires only address entries in the From and To(1) areas of the queue, whereas the Exchange task requires address entries in the From, To(1) and To(2) areas of the queue.

The addresses supplied are a composite of the stack, column and cell id's for the cells, and a composite of the stack and drive id's for the read/write drives. Preferably, the addresses are SCSI element numbers, and are provided in sequence to minimize the library controller program. For example, each stack will contain a defined range of cell addresses, for example addresses 1 through 50 for the upper half and addresses 51 through 99 for the lower half of a stack. This allows the logic to easily determine whether the upper or lower portion of the stack needs to be rotated to locate the cell towards the picker or bulk I/O door.

In an alternative embodiment, another table may be provided which comprises an inventory of the cartridges in the respective cells. The inventory is accomplished by loading both the cell number and the bar code id of the cartridge label, read by optical sensor 58 of FIG. 1.

The flags for the exemplary table 172 are T, the Move or Exchange task flag; P, the stack is positioned flag; W, the "working" flag indicating the Move or Exchange is in process; and C, the "completed" flag.

FIGS. 13A through 13E are flow charts of each of the task types illustrated in FIG. 11.

Figures 13A, 13B:
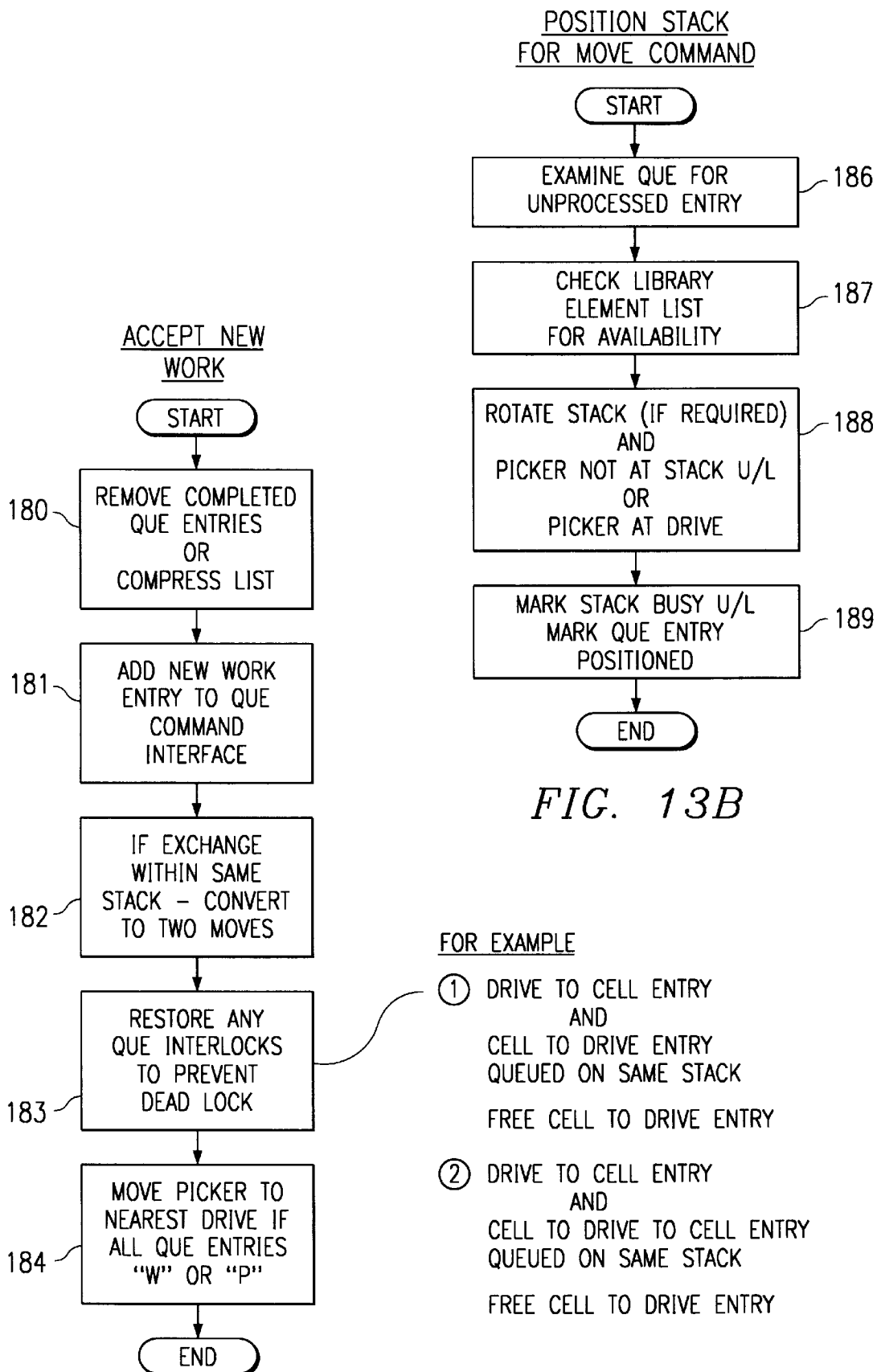
FIGS. 13A, B, C, D and E are flow diagrams of the operation of the automated library system illustrated in FIG. 11.

The "Accept New Work" task 161 is illustrated in FIG. 13A. Step 180 makes space available in the queue 172 of FIG. 12 by removing completed queue entries, flagged "C", or, if needed, compresses the list. In step 181, the new work is entered in the queue in response to the command received from the host processor system at a command interface. Step 182 responds to Exchange commands in the same stack by converting the task to two moves and a gripper move. Step 183 resolves any interlocks in the queue to prevent deadlocks during the read/write operation. In the example in FIG. 13A, moving a cartridge from a drive to a cell in one stack and moving a cartridge from a cell in the same stack to the same drive may create a deadlock if the stack is positioned for a cell to drive move, causing a situation where the drive cannot be unloaded. Therefore, the cell to drive task is deferred, allowing the drive to cell move to free the drive. In step 184, the picker is moved to the nearest drive if all queue entries are working and the stacks are positioned to allow rotation of any stacks waiting for the picker to be moved out of the way.

After the work is accepted, the specific tasks are conducted.

The "Position Stack for Move Command" task 162 is illustrated in FIG. 13B. The first step 186 examines the queue 172 for an unprocessed entry. If there is an unprocessed entry, step 187 checks the library elements table 171 for availability of the stack required for the entry, and for the current position of the required stack. Step 188 repositions the required stack, if permitted by the position of the picker. In step 189, the stack flag B="busy" is set in the library elements table 171 and the entry in queue 172 for the flag P="positioned" is set.

If a rotating stack potentially interferes with a moving picker, e.g., the top stack 13 is to be rotated while picker 30 is being repositioned between stack 12 and stack 14, step 188 stops rotation of the stack 13 until picker 30 is repositioned. Rather than stop, an alternative approach is to move the picker to a lower position and across the non-rotating bottom stack 13, or to the level of drive 27 and across, thereby avoiding the interference. Another alternative is to retract the grippers sufficiently to avoid interference.

Figure 13C:
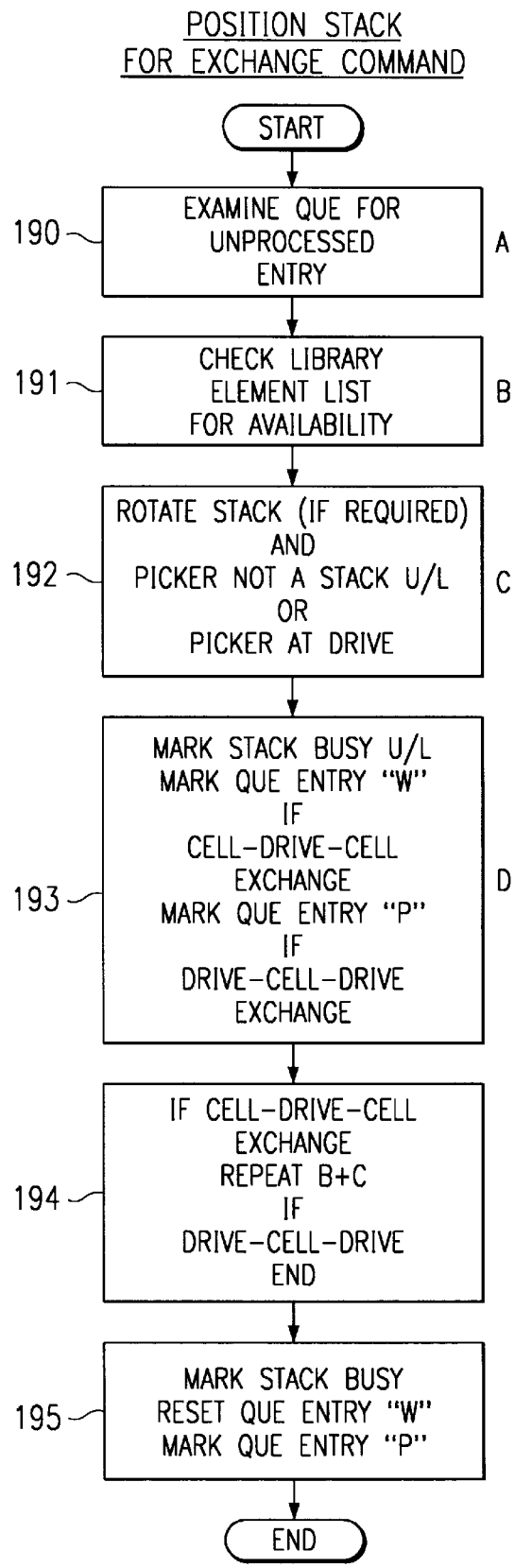

The "Position Stack for Exchange Command" task 163 is illustrated in FIG. 13C. The first step 190 examines the queue 172 for an unprocessed entry. If there is an unprocessed entry, step 191 checks the library elements table 171 for availability of the stack required for the entry, and the current position of the required stack. Step 192 repositions the required stack, if permitted by the position of the picker. In step 193, the flag B="busy" is set for the stack in the library elements table 171 and the entry in queue 172 sets the flag W="working" if the exchange is a cell-drive-cell exchange, or sets the flag P="positioned" if the exchange is a drive-cell-drive exchange. Upon completion of the first part of the cell-drive-cell exchange positioning of the stack, step 194 repeats steps 191 and 192 to conduct the second part of the positioning, and step 195 sets the B="busy" flag for the stack in the library elements table 171, resetting the queue entry W flag "off", and setting the queue entry flag P.

Figure 13D:
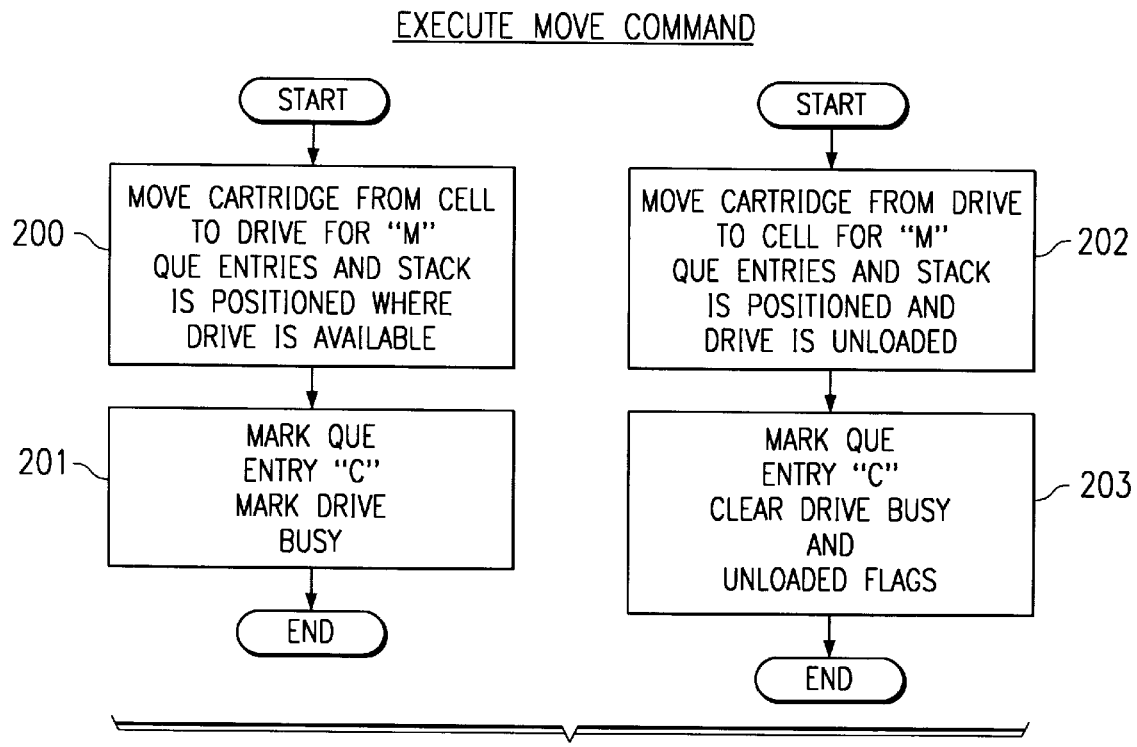

FIG. 13D illustrates the "Execute Move Command" task 164. Step 200 examines the queue 172 for M entries where the cartridge is to be moved from a cell to a drive, examines the library elements table 171 for entries indicating the stack is positioned, and examines drive status table 170 for availability of the drive. If all are available, step 200 conducts the move, setting the W="working" flag for the queue entry. In step 201, upon completion of the move, the queue entry C="completed" flag is set, and the drive table 170 B="busy" flag is set for the drive. Step 202 examines the M queue 172 for entries where the cartridge is to be moved from a drive to a cell, examines the library elements table 171 for entries indicating the stack is positioned, and examines the drive status table 170 for an indication that the U="unloaded" flag for the drive is set. In step 203, upon completion of the move, the queue entry C="completed" flag is set, and the drive table 170 B="busy" flag for the drive and the U="unloaded" flag for the drive are cleared.

Figure 13E:
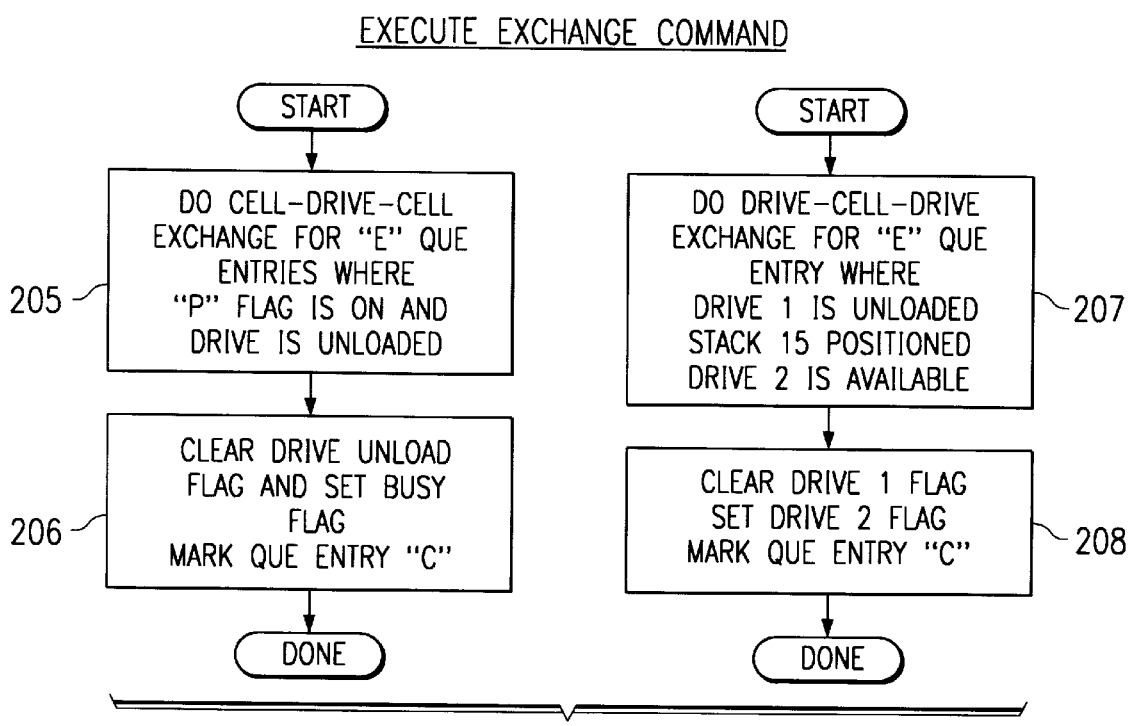

FIG. 13E illustrates the "Execute Exchange Command" task 165. Step 205 examines the queue 172 for E entries of a celldrive-cell exchange, examines and the library elements table 171 for entries indicating the stack is positioned, and examines the drive status table 170 for an unloaded drive. If all are available, step 205 conducts the exchange, setting the W="working" flag for the queue entry. In step 206, upon completion of the exchange, the queue entry C="completed" flag is set, and the drive table 170 U="unloaded" flag is cleared and the B="busy" flag is set for the drive. Step 207 examines the queue 172 for E entries of a drive-cell-drive exchange, examines the library elements table 171 for entries indicating the stack is positioned, and examines the drive status table 170 to determine if the first drive of the exchange is unloaded and that the second drive of the exchange is available. If so, step 207 conducts the exchange, setting the W="working" flag for the queue entry. In step 208, upon completion of the exchange, the queue entry C="completed" flag is set, and the drive table 170 unloaded flag for the first drive is cleared and the B="busy" flag for the second drive is set.

The present invention provides rotating stacks arranged around a rotating picker in an arrangement that increases the number of cartridges available to the picker without increasing the distance traveled by the picker, and thereby retaining access speeds.

The stacks may be rotated in either direction to increase access speeds. The control unit 33, by examining queue 172, can initiate rotation of a stack while the picker is operating in another column, also increasing access speed.

While the preferred embodiments of the present invention have been illustrated in detail, it should be apparent that modifications and adaptations to those embodiments may occur to one skilled in the art without departing from the scope of the present invention as set forth in the following claims.

We claim:

1. An automated library for storing and retrieving a plurality of like-sized data storage cartridges, comprising:

a plurality of rotatable stacks, each rotatable about an axis, all of said stacks having parallel said axes, each said stack having multiple outer faces, each generally parallel to said axis of said stack, at least two of said stack faces having a rectangular column of cells, with at least one dimension of said rectangular column of cells aligned parallel to said axis of said stack, wherein said columns of cells are offset from said axis to one side of said faces of said rotatable stacks, said cells having openings for storing said like-sized storage cartridges;

at least one read/write drive for reading and/or writing said data storage cartridges;

a picker rotatable about an axis parallel to said axes of said rotatable stacks, for accessing said like-sized data storage cartridges stored in said cells, and for transporting said like-sized data storage cartridges between said cells and said at least one read/write drive; and servo systems for rotating said rotatable stacks and said rotatable picker into mutually facing positions for accessing said openings of said cells of said stack faces of said stacks with said rotatable picker.

2. The automated library of claim 1, wherein said stacks are rectangular, having four said stack faces, and said columns of cells are located in the corners of said rectangular stacks.

3. The automated library of claim 2, wherein each said rotatable stack additionally comprises a plurality of independently rotatable stacks on a single said axis.

4. The automated library of claim 2, wherein said read/write drives additionally comprise a plurality of said read/write drives, and one of said read/write drives is located at each of said rotatable stacks.

5. The automated library of claim 2, wherein at least one of said columns of cells comprise removable bulk load containers.

6. The automated library of claim 5, wherein said bulk load containers each additionally comprises a manually operated interlock for mounting and demounting said bulk load container in said rotatable stacks.

7. The automated library of claim 6, wherein said bulk load containers and said manually operated interlocks of said containers are accessible from the opposite side of said corners from said openings of said cells.

8. The automated library of claim 6, additionally comprising an enclosure for said automated library, said enclosure having a sliding door adjacent each of said rotatable stacks for accessing said removable bulk load containers.

9. The automated library of claim 8, additionally comprising a manual entry device for indicating the desired location of one of said removable bulk load containers of a rotatable stack, and said servo system for said rotatable stack is additionally arranged to rotate said rotatable stack to position said desired location at said sliding door for said rotatable stack.

10. The automated library of claim 9, additionally comprising sensors which indicates whether each of said sliding doors are open or closed, and said servo system for said rotatable stack is responsive to said sensors to prevent rotation of any rotatable stack whose adjacent door is open.

11. The automated library of claim 2, additionally comprising a bar code reader mounted on said picker for reading and identifying bar codes on said like-sized cartridges.

12. The automated library of claim 11, additionally comprising a processor having a cell table relating the stored like-sized cartridges and the cells and columns of said rotatable stacks storing said like-sized cartridges.

13. The automated library of claim 12, wherein said like-sized cartridges are identified in said cell table by said bar codes.

14. The automated library of claim 12, additionally comprising an input channel from a host data processing system which identifies ones of said like-sized cartridges to be provided to said read/write drives, and wherein said processor operates said servo systems of said rotatable stacks to rotate said rotatable stacks to the proper position for access by said picker of said identified like-sized cartridges.

15. The automated library of claim 14, wherein said servo systems prevent rotation of one of said rotatable stacks when said picker is accessing said stack.

16. The automated library of claim 14, wherein said processor operates said servo systems, upon access by said picker of one of said stacks, to allow rotation of others of said stacks.

17. An automated library for storing and retrieving a plurality of like-sized data storage cartridges, comprising:

a plurality of rotatable stacks, each rotatable about an axis, all of said stacks having parallel said axes, each said stack having four outer faces, each generally parallel in one dimension to said axis of said stack, forming a corner between each two adjacent said faces, two of said stack faces each having two adjacent rectangular columns of cells offset, from said axis of said stack to opposite sides of said stack face, toward respective corners of said stack face, with at least one dimension of said rectangular columns of cells aligned parallel to said axis of said stack, faces of said cells of said adjacent columns angled with respect to each other to face towards a common central line parallel to said axes, said cells having openings for storing said like-sized storage cartridges;

at least one read/write drive for reading and/or writing said data storage cartridges;

a picker rotatable about an axis parallel to said axes of said rotatable stacks, for accessing said like-sized data storage cartridges stored in said cells, and for transporting said like-sized data storage cartridges between said cells and said at least one read/write drive, said axis of said picker aligned with said common central line for accessing both of said two adjacent rectangular columns of cells facing said picker; and servo systems for rotating said rotatable stacks and said rotatable picker into mutually facing positions for accessing said openings of said cells of said columns of cells facing said picker with said rotatable picker.

18. The automated library of claim 17, wherein each said rotatable stack additionally comprises a plurality of independently rotatable stacks on a single said axis.

* * * * *